July 16, 1963   D. M. ALUOTTO   3,097,763
LIQUID DISPENSING APPARATUS
Filed Nov. 30, 1960   3 Sheets-Sheet 1

INVENTOR
DOMINICK M. ALUOTTO
BY
Morton, Bennie, Edwards, Barrows and Taylor
ATTORNEYS July 16, 1963 D. M. ALUOTTO 3,097,763
LIQUID DISPENSING APPARATUS
Filed Nov. 30, 1960 3 Sheets-Sheet 2

INVENTOR
DOMINICK M. ALUOTTO
BY Pennie, Edmonds,
Morton, Barrows and Taylor
ATTORNEYS

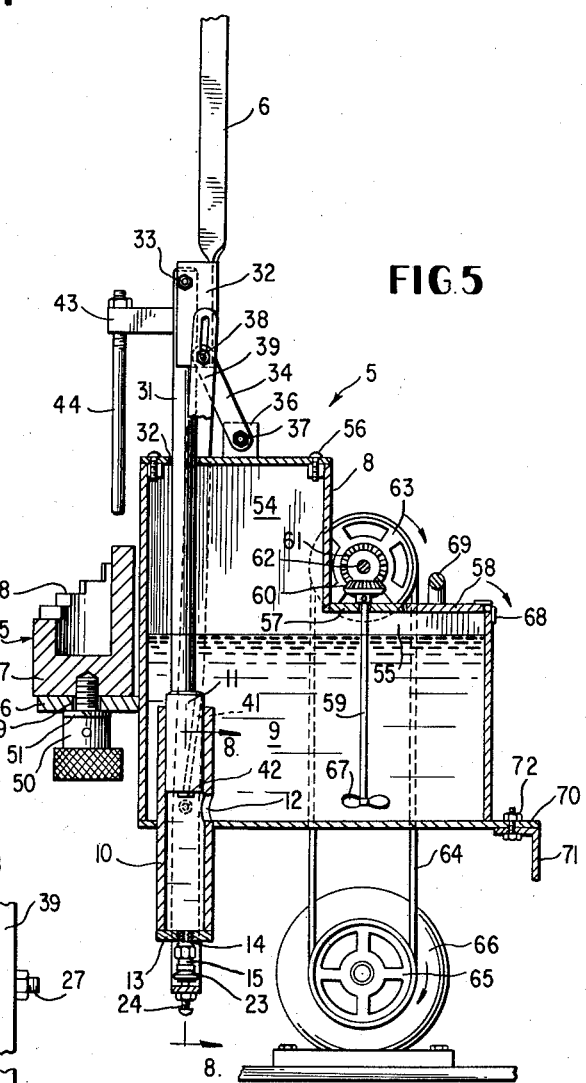
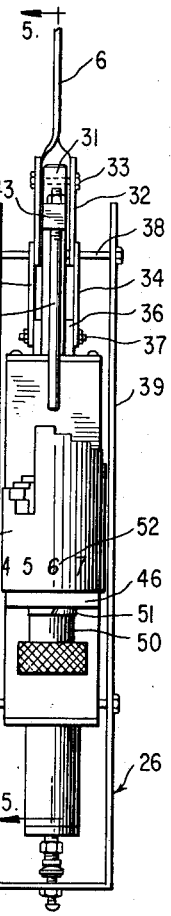
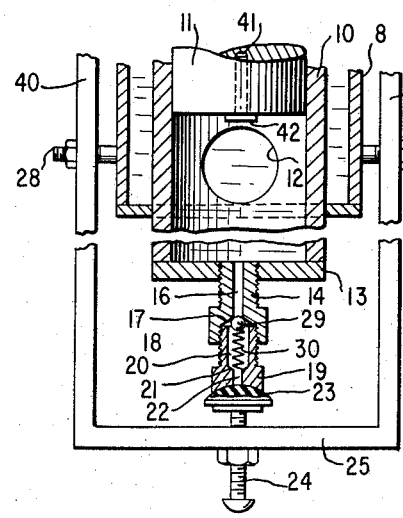
July 16, 1963 D. M. ALUOTTO 3,097,763
LIQUID DISPENSING APPARATUS
Filed Nov. 30, 1960 — 3 Sheets-Sheet 3
FIG. 4
FIG. 5
FIG. 8
INVENTOR
DOMINICK M. ALUOTTO
BY Pennie, Edmonds,
Morton, Barrows and Taylor
ATTORNEYS

United States Patent Office 3,097,763
Patented July 16, 1963

3,097,763
LIQUID DISPENSING APPARATUS
Dominick M. Aluotto, 684 Maple St., Brooklyn, N.Y.
Filed Nov. 30, 1960, Ser. No. 72,685
6 Claims. (Cl. 222—43)

This invention relates to liquid dispensing apparatus and, more particularly, to simple and accurate apparatus for dispensing a predetermined amount of a liquid.

The primary purpose of this invention is to provide a positive and mechanically simple, adjustable and accurate apparatus for dispensing predetermined amounts of liquid colorant or paint pigment into paint in order to obtain a predetermined color shade.

More particularly, the invention contemplates a dispensing apparatus including a storage receptacle for the liquid to be dispensed. A pump or dispensing cylinder is positioned partially within and partially beneath the storage receptacle and has a port in its wall within the receptacle and adjacent to the bottom wall thereof through which liquid in the receptacle may flow to fill the cylinder beneath a pump or dispensing piston when the piston is in its raised position above the port. A piston rod extends through the upper end of the cylinder and through the top wall of the receptacle to an operating mechanism located thereabove. The bottom of the cylinder is provided with a dispensing port which is normally sealed against passage of the liquid from the cylinder by a spring-loaded ball dispensing valve. The outlet from the dispensing port normally is maintained closed by a closure member but automatically is opened at the beginning of a dispensing operation. By applying downward pressure on the piston rod, the piston is moved downwardly to close the port and trap a quantity of the liquid in the lower portion of the pump cylinder. Further downward movement pressurizes the liquid within the cylinder overcoming the spring loading of the dispensing valve and causing it to open and dispense an amount of the liquid.

In order that predetermined amounts of the liquid may be dispensed, the extent of downward movement of the piston is limited by a stop member located exteriorly of the receptacle and adjustable to position different portions thereof at different heights to be engaged by a cooperating contact rod, rigidly secured to the piston rod, when the piston has moved forwardly on its dispensing stroke a distance sufficient to dispense the desired amount of the liquid from the pump cylinder.

The invention will be further described in connection with the accompanying drawings, in which:

FIG. 4 is a front view of one of the units in its normal position;

FIG. 5 is a sectional view, partially in elevation, taken along lines 5—5 of the dispensing unit of FIG. 4;

FIG. 8 is a sectional view, partially in elevation and on an enlarged scale, taken along lines 8—8 of FIG. 5.

Figure 1:
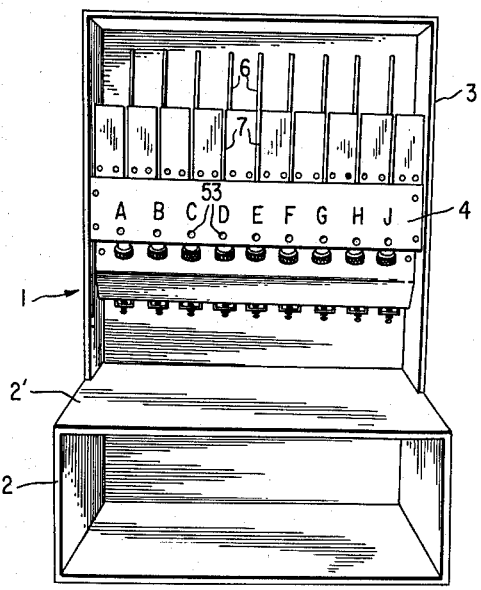
FIG. 1 is a front perspective view of a dispensing apparatus including a multiplicity of the liquid dispensing units of the invention.
Figure 2:
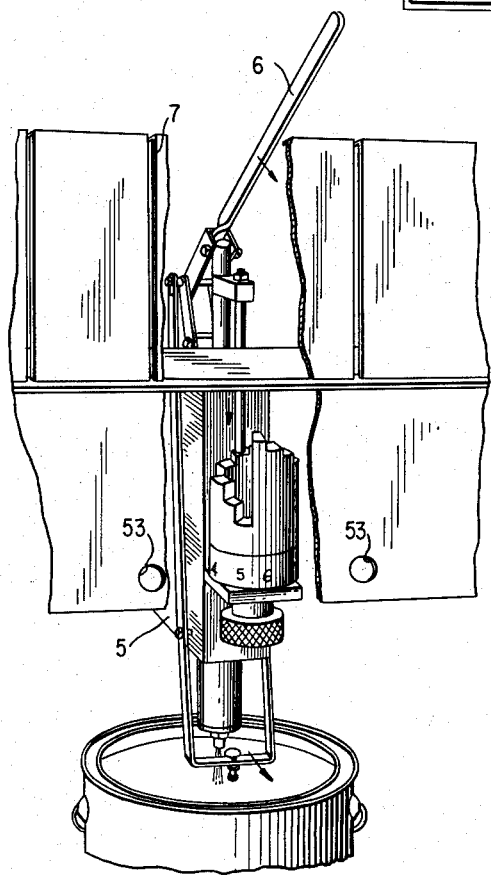
FIG. 2 is a perspective view, partially broken away, showing one of the units of FIG. 1, in the process of dispensing liquid into a bucket of paint.

Referring now to FIG. 1, a housing 1 comprises a base section 2 and an upstanding top section 3 mounted on the top 2′ of the base section. The base section 2 extends forwardly of the top section and provides a platform on which paint buckets or the like may be supported. The enclosure defined by the base section provides a convenient storage compartment for additional paint buckets or for containers of pigment.

Extending across approximately the front middle third of the top section is a panel 4 behind which are positioned a number of liquid dispensing units 5, each having an operating handle 6. The upper portion of this panel has slots 7 lying directly in front of the handles 6 of the dispensing units or dispensers and through which the handles may pass. The middle portion of the panel 4 carries indicia, shown as A through J, one in front of each dispensing apparatus, to designate, for example, the color of liquid paint pigment it contains.

Each dispenser unit comprises a fluid-tight storage receptacle 8 for a body 9 of a paint pigment or colorant. A dispensing or pump cylinder 10 is positioned in the receptacle, near the front wall thereof, and has its lower end protruding through the bottom wall of the receptacle to a substantial distance beneath it. A dispensing or pump piston 11 is mounted for reciprocation in the cylinder. The wall of the cylinder has a port 12 through which liquid from the body 9 may flow to fill the cylinder beneath the piston therein when the piston is raised to its upper position above the port. While the tolerance between the piston and cylinder ordinarily is sufficient to maintain a fluid-tight engagement, piston rings (not shown) may be provided on the piston to insure a fluid-tight engagement of the piston with the cylinder walls. The bottom of the dispensing cylinder is closed by a plate 13 having a centrally located opening into which is threaded a nipple 14 of a valve assembly 15 which normally prevents flow of liquid from the cylinder. As shown in FIG. 8, nipple 14 has an axial bore 16 which flares outwardly at 17 to form an enlarged bore 18. Into this enlarged bore is threaded a second nipple 19 also having an axial bore 20 which, at a constricted portion 21, narrows to form a discharge orifice 22 of a reduced bore, of approximately the same diameter as bore 16, through which the liquid is dispensed. The lower end of nipple 19 is concave to provide a seat for a convex resilient closure 23 carried by an adjustable screw 24 passing through the base 25 of a swinging bail 26 pivoted on stub shafts 27 and 28 extending outwardly from the side walls of receptacle 8. The closure normally seals the nipple 19 against entry of air which would result in the drying of any liquid remaining in the nipple with possible eventual clogging thereof. The flared portion 17 of nipple 16 forms a seat for a ball valve 29 which is urged upwardly to its closed position by a compression spring 30. The other end of the spring bears against the constricted portion 21. The ball valve normally closes the bore 16 and prevents liquid in the dispensing cylinder form flowing out through the valve assembly.

A piston rod 31 is connected to the upper end of the dispensing piston and extends upwardly through an opening 32 in the top wall of the receptacle 8. The lower end of the dispensing handle 6 terminates in a U-shaped channel portion 32, the legs of which straddle the upper end of the piston rod 31 and are pivoted thereto by a bolt 33. A pair of links 34 and 35, one at each side of the piston rod 31 and the U-shaped channel portion 32, are pivoted at their lower ends by an attaching bolt 37 to opposite sides of an upstanding lug 36 attached to the upper wall of the receptacle 8. The upper ends of the links 34 and 35 are pivotally connected by a bolt 38 to the lower portion of the U-shaped channel portion 32, near the base thereof. The legs 39 and 40 of the bail 26 extend upwardly at each side of the dispensing unit to a position opposite the channel portion 32 of the handle 6. The upper ends of the legs 39 and 40 are provided with slots which receive the bolt 38. Thus, the upper ends of the legs of the bail are pivotally connected to both the channel portion 32 of the handle 6 and the upper ends of the links 34 and 35.

The handle 6 normally is in an upright or vertical position, as shown in FIG. 5. In this position, piston 11 is raised above the port 12 allowing liquid to flow by gravity from the receptacle into the dispensing cylinder. When the handle is in this position, the bail 26 also is in an upright position and the resilient closure 23 is seated on the concave lower end of nipple 19 and effectively closes the discharge orifice 22.

Figure 6:
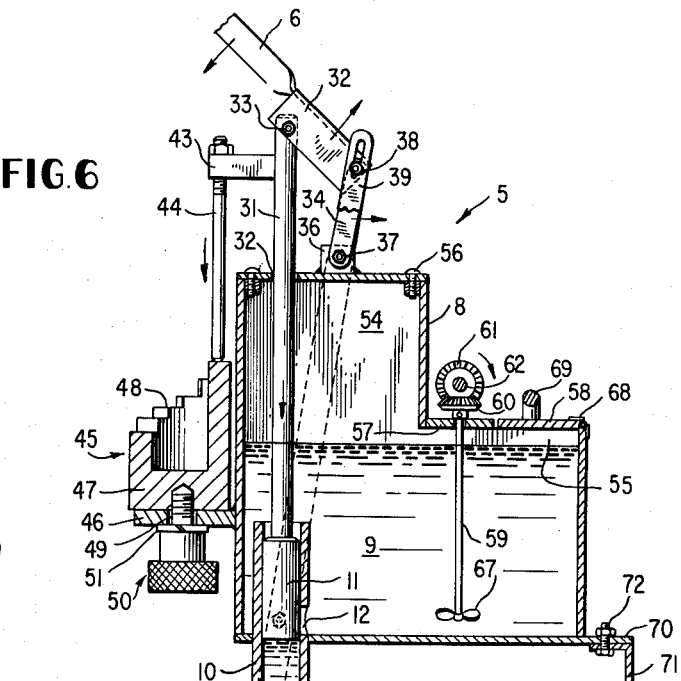
FIG. 6 is a view similar to that of FIG. 5 showing the position of the parts during a dispensing operation.

To dispense liquid, the handle 6 is pulled forwardly and downwardly, first pivoting about bolt 33 and causing the lower end of U-shaped channel portion 32, links 34 and 35 and legs 39 and 40 of bail 26 to swing backwardly about bolt 37, as shown in FIG. 6. The backward movement of the legs of bail 26 causes the bail to pivot about the stub shafts 27 and 28 and its base 25 to swing forwardly, moving resilient closure 23 away from its seat beneath valve 15 and opening the orifice 22 to permit discharge of liquid from the pump cylinder. Further forward and downward movement of handle 6 causes the handle to pivot about bolt 37 forcing the piston rod 31 and piston 11 in the cylinder downwardly to first force liquid from the cylinder back through port 12 into the receptacle 18 until the lower end of the piston has passed the lower end of the port, and thereafter to pressurize the liquid trapped in the lower end of the cylinder. This pressure is exerted by the liquid on ball valve 29 and against the pressure of spring 30 and will, when great enough, overcome the biasing force of the spring and move the ball away from its seat permitting the liquid to flow around the ball and out through the open discharge orifice 22 of nipple 19. Only by maintaining the downward movement of the handle, and thus of piston 11, will the trapped liquid within cylinder 10 continue to exert sufficient pressure on ball valve 29 to hold it away from the flared portion permitting the liquid to flow out through the valve. In other words, when the downward movement of the piston stops, the pressure of the trapped liquid within the cylinder decreases by virtue of the liquid flowing out through the valve until the biasing force of spring 30 against ball valve 29 overcomes the liquid pressure and urges the ball against its seat to stop the flow of liquid and close the valve. After a dispensing operation has been completed, the handle is returned to its upright position to raise the piston above the port 12 and again allow liquid to flow into the dispensing cylinder to ready the unit for the next operation.

In order to permit liquid to flow into the space beneath the piston during the upward movement thereof, which upward movement produces a partial vacuum in the space beneath the piston, tending to impede the upward movement, a longitudinal passage 41 is provided through the piston. This passage is closed by a flap valve 42, located at the lower end of the piston during downward movement of the piston; but as the piston is retracted, the flap valve opens to permit liquid to flow through the passage and into the space beneath the piston.

In order that the amount of liquid dispensed in any dispensing operation may be predetermined, an outwardly extending arm 43 is welded or otherwise attached to the upper end of the piston rod 31. The outer end of the arm 43 is provided with a threaded opening having a vertical axis parallel to but in front of the front wall of the storage receptacle. A contact rod 44 is threaded into this opening and extends downwardly to engage an adjustable stop member 45 when the piston 11 moves downwardly in the cylinder on a dispensing stroke. The stop member is adjustably mounted on a shelf 46 welded or otherwise secured to the lower portion of the front wall of the receptacle 8. The stop member is in the form of a cylinder having its lower end closed by a wall 47. The top edge of the wall of the cylinder is shaped to form, around the circumference thereof, a plurality of stepped ledges 48, each of which lies a different height above the bottom of wall 8.

To permit different ones of the ledges of the stop member to be brought to a position directly beneath the contact rod 44, the shelf has an opening 49. An adjusting knob 50 beneath the shelf has a threaded portion extending through the opening 49 and threaded into the bottom wall 47 of the stop member sufficiently tightly that the stop member and adjusting knob move as a unit. The lower end of the adjusting knob 50 is enlarged and knurled to provide a better gripping surface. A spring washer 51 is interposed between a shoulder on the adjusting knob and the shelf 46 and exerts enough frictional force against the shoulder of the adjusting knob and bottom of the shelf to hold the stop member in any position to which it may be turned. The stop member 45 may be adjusted to any desired setting merely by grasping the knurled surface of the knob 50 and rotating it to bring the desired ledge beneath the contact rod.

Downward movement of the piston 11 and piston rod 31 due to forward and downward movement of the handle 6 will also cause a downward movement of the contact rod 44. The downward movement of the piston is limited by the lower end of the contact rod coming into engagement with the ledge 48 of the stop member which lies directly beneath it, as shown in FIG. 6. The amount of downward movement permitted of the contact rod, and thus of the piston rod, may be varied by rotating the knob 50 to rotate the stop member 45 to locate a ledge of different height beneath the contact rod. The variation in downward movement of the piston rod due to the different height of ledges 48 may be clearly seen in FIG. 4. Thus, the stop member and its associated contact rod afford a positive and mechanically simple, adjustable and accurate manner of limiting the downward movement of the piston rod and dispensing piston and thus of selectively controlling the amount of liquid dispensed, which may be selectively varied by varying the adjustment of the stop member.

Around the base of the stop member are numbers 52, each indicative of the height of the diametrically opposite ledge 48. The numbers of the stop members of the respective dispensing units lie back of openings 53 in the panel 4 so that the operator will know the setting of the stop member and consequently the amount of liquid which will be dispensed on each dispensing operation.

Figure 3:
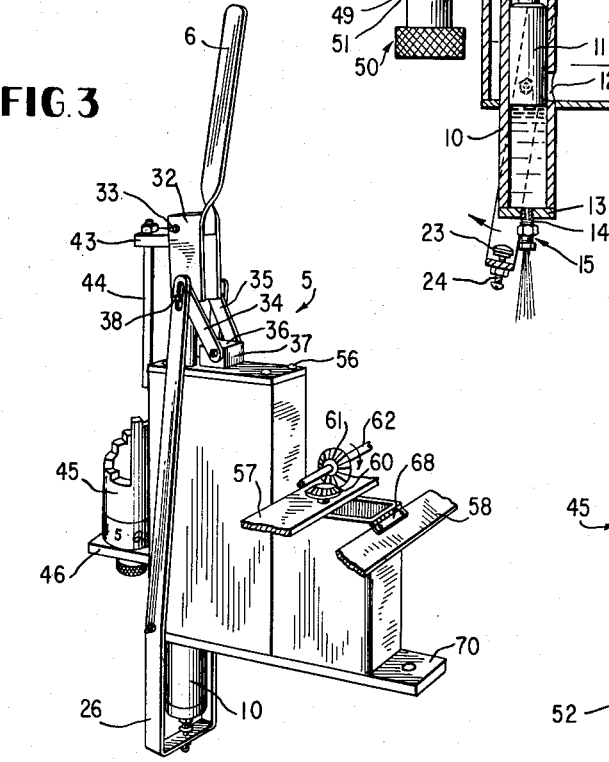
FIG. 3 is a perspective view of one of the units in its normal non-dispensing position.
Figure 7:
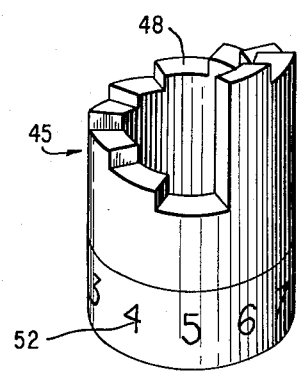
FIG. 7 is a perspective view of the adjustable stop member.

Each storage receptacle consists of a front portion 54 and a back portion 55. The top wall of the front portion is secured to the side walls as by screws 56. This provides a secure platform for supporting the handle and linkage mechanism. The top wall of the back portion of the storage receptacle is in two sections, a front section 57 and a back section 58. As shown by FIG. 3, these two sections extend along the entire length of the liquid dispensing units. A stirrer rod 59 extends through a centrally located opening in the front section 57 of each dispensing unit. Attached to the upper end of this rod and lying on top of the front section is a bevel gear 60 which meshes with a bevel gear 61 carried by a shaft 62 on which a pulley 63 also is mounted. A drive belt 64 passes around the pulley 63 and a pulley 65 connected to the drive shaft of an electric motor 66. In this manner power from the electric motor is transmitted to the stirrer rod 59. A stirring blade 67 is secured to the lower end of the rod. Thus, rotation of the rod 59 will cause rotation of the blade 67 and set up a circulating current within the liquid which maintains a uniform mixture of the liquid. The back section 58 of the top wall is attached to the storage receptacles by a hinge 68. A handle 69 is attached to the top of the back section to facilitate opening of the back section to give access to the interior of the storage receptacles. This opening permits the level of the liquid within the receptacle to be inspected and additional liquid added as necessary.

Projecting beyond the back of each dispensing unit is an outstanding flange 70. To attach the dispensing unit to the housing, an angle iron 71 is appropriately positioned at the back of the top section 3 to enable the flange 70 to be bolted thereto by a bolt 72.

It is to be understood that various changes within the skill of the art may be made in the details of the dispensing units herein described without departing from the invention or sacrificing any of the advantages thereof, the scope of the invention being set forth in the appended claims.

I claim:

1. A liquid dispensing apparatus comprising a receptacle for holding a liquid, a dispensing cylinder passing through the bottom of the receptacle, the cylinder extending partly within and partly without the receptacle, the end of the cylinder outside the receptacle being closed, a port in a portion of the dispensing cylinder within the receptacle through which liquid may flow from the receptacle into the dispensing cylinder, a discharge orifice in said closed end of the cylinder, means including a pressure-openable valve for closing said discharge orifice, a dispensing piston within the dispensing cylinder, means for reciprocating the dispensing piston in the dispensing cylinder past the port to trap and pressurize liquid between the piston and said closed end, said means for reciprocating said piston including a piston rod and means for actuating said piston rod, a contact rod attached to and movable with the piston rod, a cylindrical stop member disposed in the path of movement of the contact rod on a dispensing stroke of the piston, said stop member being adjustable to different positions beneath said contact rod and having a plurality of ledges formed on one end thereof each adapted to lie a different distance from the contact rod on adjustment of the stop member, the other end of the stop member being closed, a shelf attached to and protruding from the receptacle and having an opening therethrough, said stop member being supported on said shelf, a knob having one end passing through and being rotatable in the opening in the shelf and being secured to the closed end of the stop member, whereby the stop member selectively may be rotated to position a selected ledge thereof in the path of movement of the contact rod to selectively limit movement of the contact rod on a dispensing stroke of the piston.

2. A liquid dispensing apparatus as set forth in claim 1, in which the means for actuating the piston rod includes a handle pivotally attached to the piston rod and having a portion extending beyond the pivot, and at least one link pivotally attached at one end to the portion of the handle extending beyond the pivot and pivotally attached at its other end to the receptacle, and including a bale having two legs and a base portion, stub shafts extending outwardly from opposite sides of the receptacle, the legs of said bale being pivoted at an intermediate portion thereof to said stub shafts, the end portion of the legs of the bale remote from the base thereof being pivotally attached to the handle, the base portion of the bale being adjacent to said discharge orifice when the handle is in a position to locate the piston to allow liquid to flow through said port into the dispensing cylinder, and a closure member carried by said base portion of the bale and closing said orifice when the handle is in said position, whereby the initial movement of the handle to move the piston past the port to trap liquid in the cylinder swings the bale about said stub shafts and moves said closure member away from said orifice.

3. A liquid dispensing apparatus comprising a receptacle for holding the liquid, a discharge orifice in the receptacle, means for dispensing the liquid through the orifice including a handle attached to the receptacle, said handle being movable from a first position to a second position during which movement liquid is dispensed through the discharge orifice, a bail having two legs and a base portion, stub shafts extending outwardly from opposite sides of the receptacle, the legs of said bail being pivoted at an intermediate portion thereof to said stub shafts, the end portion of the legs of the bail remote from the base thereof being pivotally attached to the handle, the base portion of the bail being adjacent to said discharge orifice when the handle is in the first position, and a closure member carried by said base portion of the bail and closing said orifice when the handle is in said first position, whereby movement of the handle from the first position towards the second position swings the bail about said stub shafts and moves said closure member away from said orifice.

4. A liquid dispensing apparatus as set forth in claim 3 in which the closure member is resilient and has a convex closing surface, and the discharge orifice terminates in a concave surface to be engaged by said convex surface of the closure member.

5. A liquid dispensing apparatus comprising a receptacle for holding a liquid, means for dispensing liquid from the receptacle including a dispensing piston, a piston rod attached to the dispensing piston, means attached to the piston rod for moving the dispensing piston and actuating the dispensing means to dispense liquid from the receptacle, a contact rod attached to and movable with the piston rod, a cylindrical stop member, one end of the stop member having a plurality of ledges each lying at a different distance from the other end and adapted, selectively, to be brought into a position beneath said contact rod, a shelf attached to and protruding from the receptacle and having an opening extending therethrough, a knob having one end thereof passing through the opening of the shelf and secured to the stop member, said end of the knob being free to rotate in the opening in the shelf to rotate said stop member, whereby the knob may be rotated to rotate the stop member to selectively position any one of the said ledges in the path of the movement of the contact rod so that movement of the contact rod and movement of the piston may be selectively limited to allow a predetermined amount of liquid to be dispensed.

6. A liquid dispensing apparatus comprising a receptacle for holding the liquid, a discharge orifice in the receptacle, means for dispensing the liquid through the orifice including actuating means, a bar pivotally attached adjacent to one end to the actuating means and pivotally attached at an intermediate portion to the receptacle, the end portion of the bar remote from the actuating means having a portion extending adjacent to said discharge orifice of the valve, a closure carried by the portion of the bar adjacent to the orifice for closing the discharge orifice, whereby movement of the actuating means on a dispensing stroke causes the bar to pivot and move the closure away from the discharge orifice.

References Cited in the file of this patent

UNITED STATES PATENTS

| | | |
|---|---|---|
| 746,326 | Hain | Dec. 8, 1903 |
| 1,656,050 | Davis | Jan. 10, 1928 |
| 1,666,178 | Neuls | Apr. 17, 1928 |
| 1,838,735 | Berg | Dec. 29, 1931 |
| 2,403,122 | Reisert et al. | July 2, 1946 |
| 2,834,051 | Rekettye | May 13, 1958 |
| 2,979,233 | Smith et al. | Apr. 11, 1961 |

FOREIGN PATENTS

| | | |
|---|---|---|
| 187,132 | Great Britain | Oct. 19, 1922 |